United States Patent
Smith

(10) Patent No.: US 7,817,452 B2
(45) Date of Patent: Oct. 19, 2010

(54) PHASE SHIFTED H-BRIDGE RESONANT CONVERTER WITH SYMMETRICAL CURRENTS

(75) Inventor: Stephen William Smith, 487 Crosstie Rd., Appomattox, VA (US) 24522

(73) Assignee: Stephen William Smith, Appomattox, VA (US)

( * ) Notice: Subject to any disclaimer, the term of this patent is extended or adjusted under 35 U.S.C. 154(b) by 575 days.

(21) Appl. No.: 11/891,619

(22) Filed: Aug. 13, 2007

(65) Prior Publication Data

US 2009/0046482 A1 Feb. 19, 2009

(51) Int. Cl.
*H02M 7/5387* (2007.01)
*H02H 7/122* (2006.01)

(52) U.S. Cl. .................................... 363/132; 363/56.02

(58) Field of Classification Search .................... 363/17, 363/56.02–56.05, 98, 132; 361/18, 58, 90, 361/91.1
See application file for complete search history.

(56) References Cited

U.S. PATENT DOCUMENTS

| | | | |
|---|---|---|---|
| 4,864,479 A | 9/1989 | Steigerwald et al. | |
| 5,438,497 A | 8/1995 | Jain | |
| 5,442,540 A | 8/1995 | Hua | |
| 5,642,249 A * | 6/1997 | Kuznetsov | ................... 361/58 |
| 6,483,721 B2 * | 11/2002 | Terashi | ......................... 363/17 |
| 2005/0036245 A1 * | 2/2005 | Greenfeld | ..................... 361/18 |

OTHER PUBLICATIONS

"Resonant Power Converters" Marian K. Kazimierczuk and Dariusz Czarkowski; Wright State University and University of Florida, 1995 pp. 140-241, 241-294, 331-345.
"Protecting MOSFETs against Overcurrent Events" Power Electronics, Jan. 2006 pp. 14-21.
"Coupled Inductors Improve Multiphase Buck Efficiency" Power Electronics, Jan. 2006 pp. 36-42.
"Designing Coupled Inductors" Power Electronics, Apr. 2006 pp. 14-21.

* cited by examiner

*Primary Examiner*—Jessica Han

(57) ABSTRACT

A phase shifted H-bridge resonant converter with symmetrical currents includes, a DC storage cap (31), four switches (1-4) with a parallel turn off network consisting of diodes (5-8), capacitors (9), (11), (14), (16), resistors (10), (12), (13), (15). The subsequent output of switches (1-4), is arranged in series with DC blocking caps (17-18), connected to a low mutually coupled inductor (32), an AC resistive load, capacitor (19), resistor (20) across inductor (32), with capacitors (22), (23) that comprise a resonant tank circuit, and is connected to the primary of transformer (21) wherein the interaction between the two coils of the low mutually coupled inductor (32) provides symmetrical currents within the switches and resonant tank circuit. Further, output rectification may be arranged by use of secondary winding of transformer (21), diodes (24-27), filter inductor (28), filter capacitor (29), and load resistor (30).

6 Claims, 13 Drawing Sheets

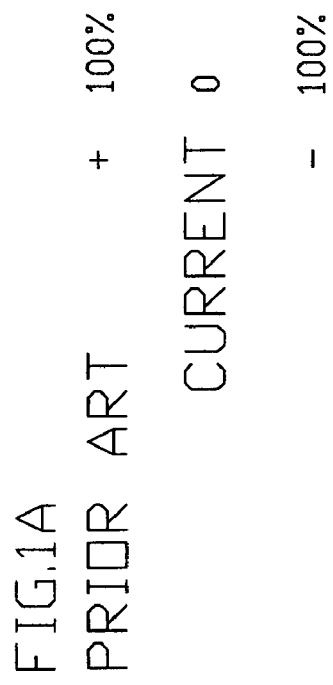
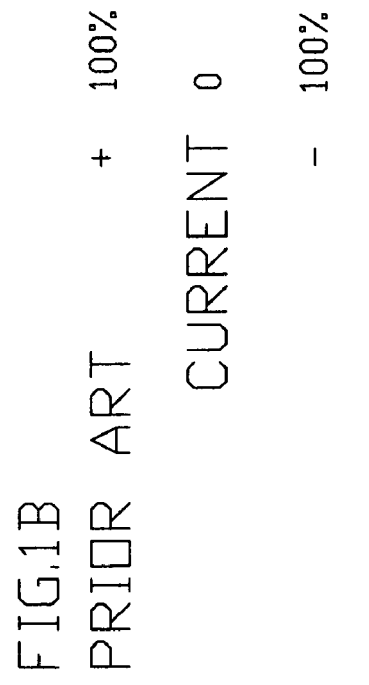
FIG.1A PRIOR ART
FIG.1B PRIOR ART

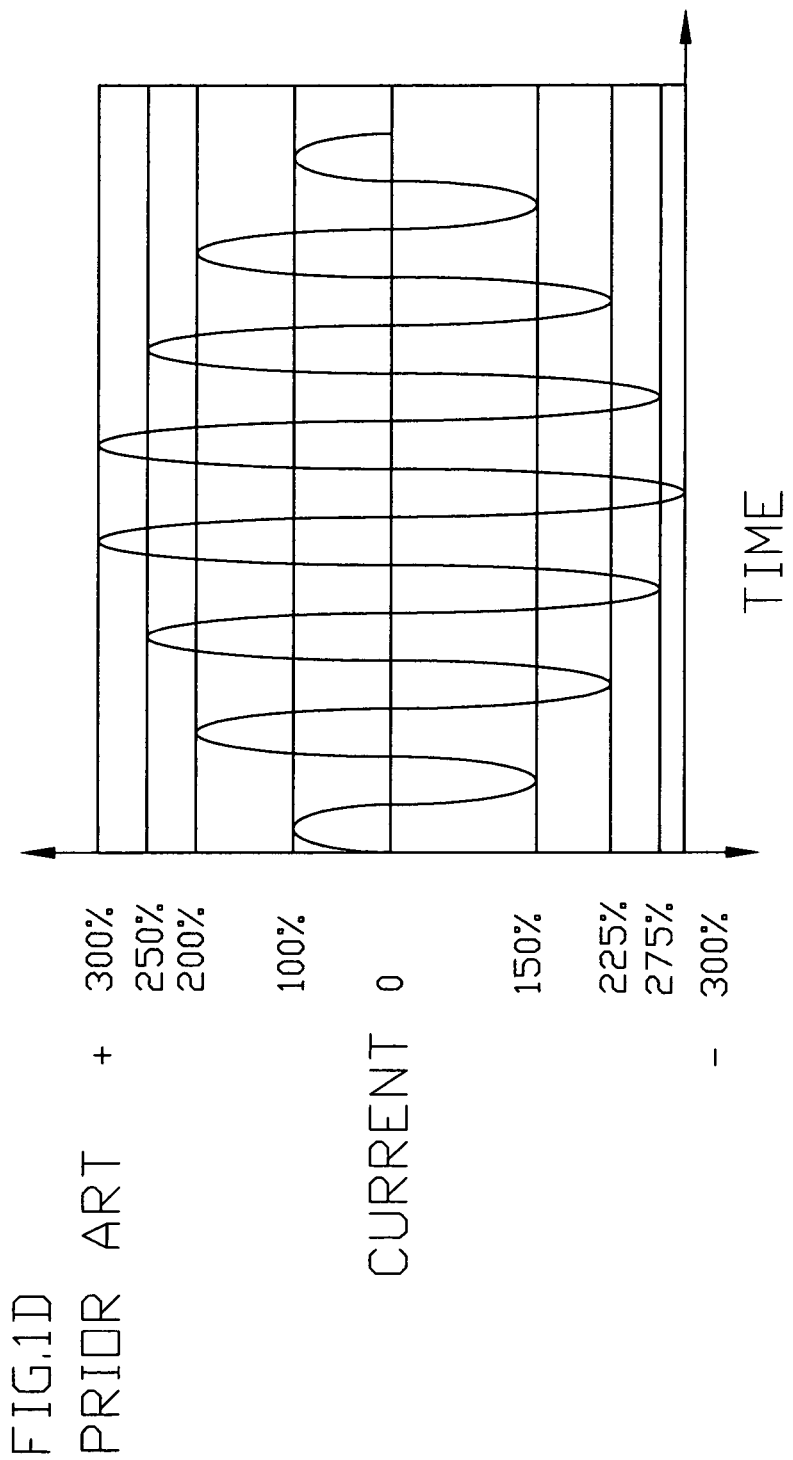

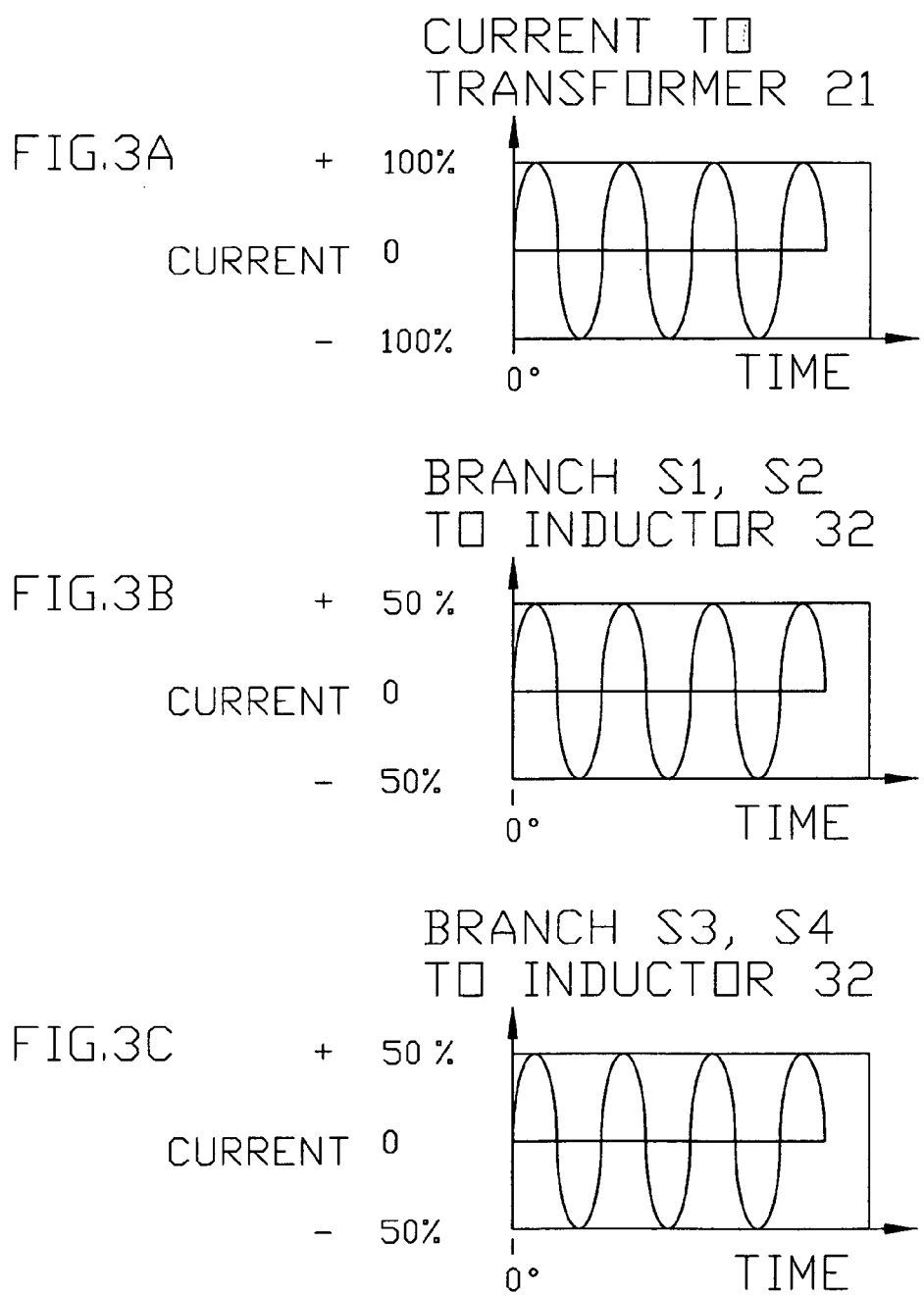

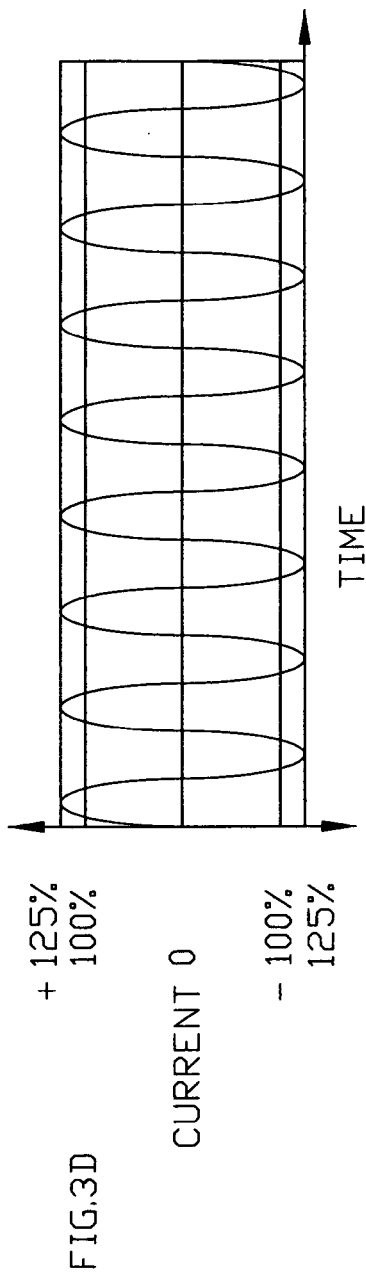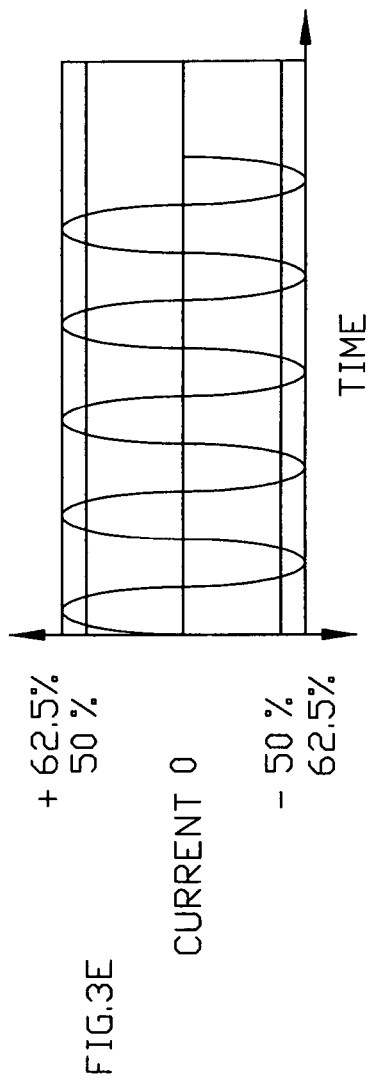
FIG.3D
FIG.3E

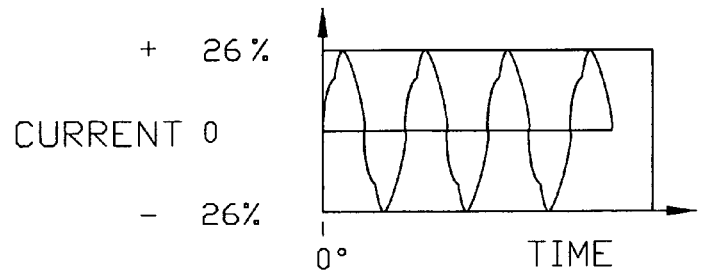
FIG.3F  BRANCH S1, S2 TO INDUCTOR 32
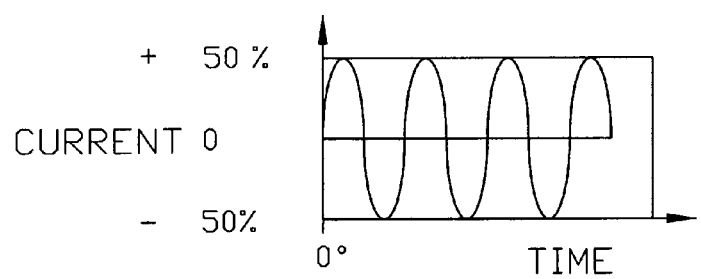
FIG.3G  CURRENT TO TRANSFORMER 21
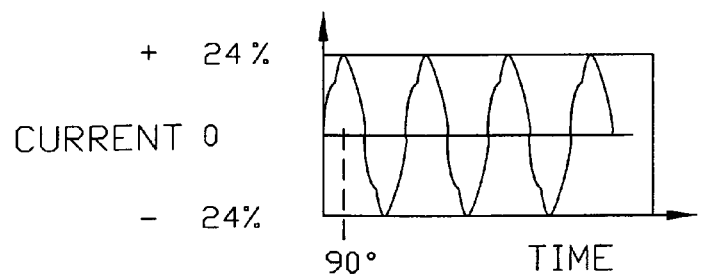
FIG.3H  BRANCH S3, S4 TO INDUCTOR 32

PHASE SHIFTED H-BRIDGE RESONANT CONVERTER WITH SYMMETRICAL CURRENTS

TECHNICAL FIELD AND INDUSTRIAL APPLICABILITY OF THE INVENTION

This invention relates to the design of H-Bridge phase-shifted resonant converter with symmetrical currents. This present invention relates in particular to the operation of the converter in over-load, load, and no-load conditions. The invention reduces stress and potential failures of the devices in the H-Bridge phase-shifted resonant converters.

BACKGROUND OF THE INVENTION

Most dc-to-dc converters employing H-Bridge topologies achieve the conversion of a primary dc voltage input to an output regulated dc voltage. Typically, the dc input voltage is converted to an ac voltage (or pulses) by switching devices (transistor, mosfet, insulated gate bipolar transistor or thyristor). The ac voltage is then converted to a regulated dc output voltage. By controlling the duty cycle or the frequency of the ac voltage (or pulses), the desired output voltage or output current regulation can be achieved. These methods of controlling the output are typical of all dc-to-dc converters employing H-Bridge topologies. The introductions of H-Bridge resonant circuits (phase shifted, series, parallel, parallel loaded, etc.) are used for high frequency dc-to-dc conversion. This has been integral to higher power density and efficiency improvements.

H-Bridge converters of present have reduced the losses associated with switching devices (transistor, mosfet, insulated gate bipolar transistor or thyristor) during turn-on and turn-off transitions. These circuits have not shown to correct, in a "passive manner," the limiting of peak currents in the switching devices. In addition, they do not produce symmetrical currents. These circuits are less than ideal when the converter output (pwm, phase shifted, frequency, and cycle start-stop) is modulated to partial output or near zero output conditions.

However, controlling the current in the converters with an active current protection scheme does not always result in protecting the switching devices from failures. The circuits attempt to limit the rise of current in the switching devices by shutting down the drive circuitry for the interval required. All switching devices have a specified turn off time and current will continue to flow until the turn off time has been reached. The maximum rated current of a switching device can be exceeded during the specified device turn off interval (defined as the storage time and fall time of the device). In this active protection scheme, this interval is the function of the speed in which the control circuit reacts and the device turn off time. These intervals also change with of the junction temperature of the switching devices. This can exacerbate the failure of the active protection scheme.

A number of patents address the advantage of H bridge resonant mode dc-dc converters, e.g. U.S. Pat. No. 4,864,479 (Steigerwald et al) issued Sep. 5, 1989, U.S. Pat. No. 5,442,540 (Hula et al.) issued Aug. 15, 1995, U.S. Pat. No. 5,438,497 (Jain et al.) issued Aug. 1, 1995. The historical problems with these power conversion topologies are that the operation of H-Bridge resonant circuits can be compromised in open or short circuit conditions. When the H-Bridge is operated without symmetrical switch currents and peak current limitations, the peak voltages and currents through the H-Bridge switches can be excessive. This often results in switch failure. H-Bridge resonant circuit improvements have contributed greatly to more efficient and cost effective solutions to dc-to-dc converters. The proposed invention addresses the condition specific shortcomings described above.

SUMMARY OF THE INVENTION

A H-Bridge resonant circuit is operated in a phase-shifted manner at fixed frequency that allows near zero output voltage and currents. This invention proposes the use of a low mutually coupled inductor wherein the interaction between the two coils provides symmetrical currents within the switches, resonant tank circuit and a small AC load circuit to dissipate the remaining parasitic currents from the switching devices, snubber circuits and resonant tank circuit.

An object of this invention is to prevent the peak currents from exceeding the switching devices ratings.

Another object of the invention is to achieve symmetrical operation of the switching devices, which is superior over past dc-to dc converters circuits.

In one embodiment of the present invention, a comparator turn off circuit that will shut off the pulses to the switches in the H-Bridge resonant circuit. This produces zero output voltage and currents.

Furthermore, introducing a low mutually coupled inductor controls the maximum symmetrical current in the H-bridge in open, short or under load conditions. This reduces the need for high power switching devices, and complex protection control circuits that add to the cost.

The final object of this invention is to demonstrate that the introduction of a low mutually coupled inductor reduces the AC load circuit power requirement as it balances the recycled power from the resonant tank circuit of the H-bridge.

BRIEF DESCRIPTION OF THE DRAWINGS

FIG. 1A- 1D according to prior art illustrates the current waveforms of the resonant tank circuit of a series parallel loaded H-Bridge resonant converter under load, short and open.

FIG. 3A-3K illustrates the current and voltage waveforms of the proposed H Bridge phase-shifted converter with symmetrical currents.

FIG. 4 is a schematic representation of a comparator turn off circuit that controls the drive pulses to the switches of the H Bridge.

DETAILED DESCRIPTION OF THE PREFERRED EMBODIMENTS

While specific embodiments of the invention have been shown and described in detail to illustrate the specific application of the principals of the invention, it will be understood that the invention may be embodied as fully described in the claims, or as otherwise understood by those skilled in the art, without departing from such principals.

Figure 1:
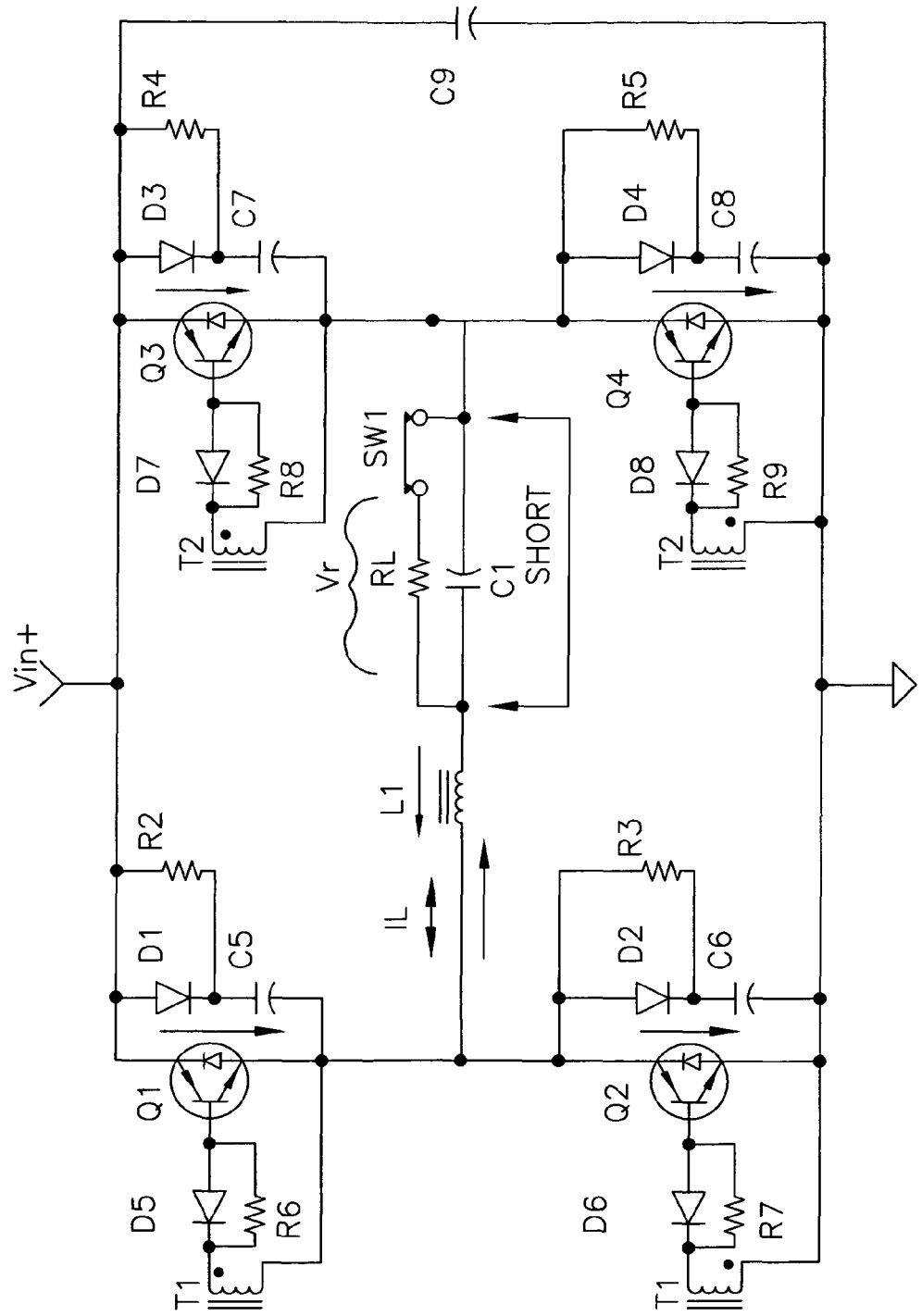
FIG. 1 according to prior art is a schematic representation of a series parallel loaded H-Bridge resonant converter.

FIG. 1 is a circuit diagram of a parallel loaded H-Bridge resonant converter according to prior art. RL represents a load, which is equivalent to a transformer rectifier output. The converter operates at a constant switching frequency and is controlled by gate signals applied to Q1-Q4. As seen in the figure, the resonant tank circuit is comprised of L1, C1, and R1. "SW1" represents an open or a shorted load condition across C1. An input DC voltage, V+ is converted to an output voltage Vr and output current Ir, which in turn is applied to RL.

FIG. 1A is the current IL through RL under normal load conditions, with SW1 closed. The current is at normal amplitude within the design limits.

FIG. 1B is the current IL through L1, C1, and RL during an abnormal condition shown with SW1 closed across C1 and RL. The current is at the normal amplitude within the design limits. This is the typical operation of a parallel resonant converter with a short across load RL. The converter will operate safely with and output short near resonance.

Figure 1C:
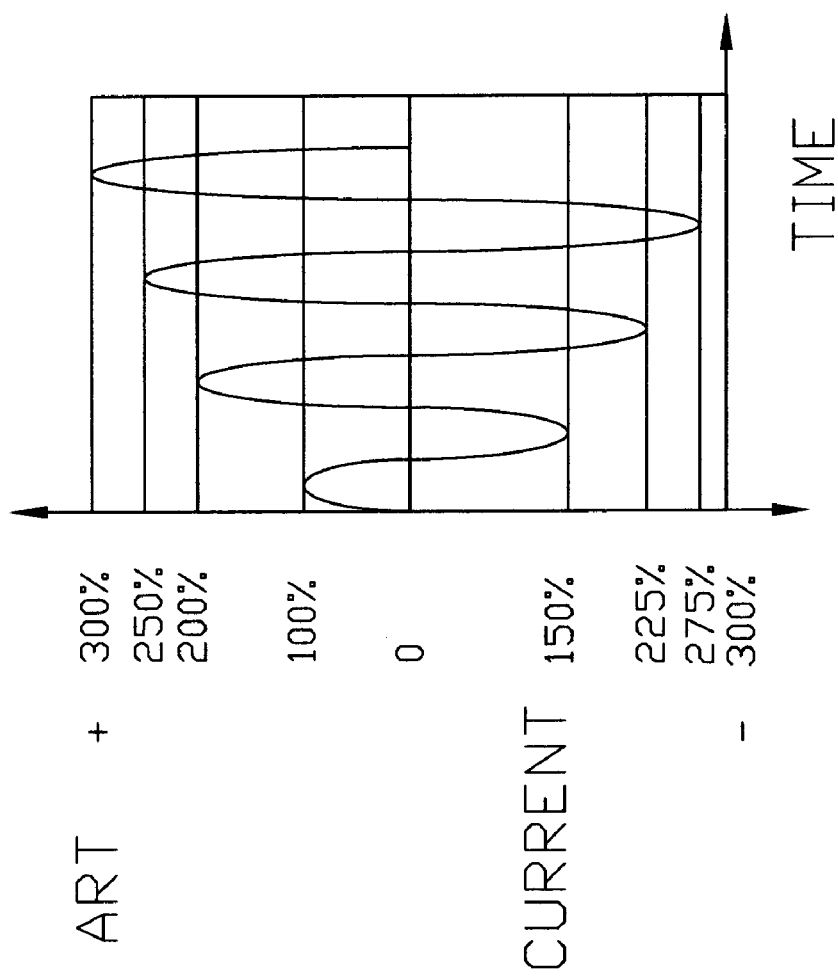

FIG. 1C and FIG. 1D is the current IL through RL during abnormal conditions with SW1 opened. The current will keep climbing as shown in FIG. 1C if there is no external control to limit it.

FIG. 1D is a representation of an over current control using external control circuits. The equation that explains the condition is IL=2VinZo/πr. The term Zo is the AC resistance after SW1 is opened to with a normal load. The normal load current, IL=20 amp. To illustrate, if Vin=320V, Zo=250 ohm, and R=2 ohm, the current IL=127 amps. This over current would destroy the resonant components L1, C1 and the switches Q1-Q4. An over current control circuit cannot reduce this potential catastrophic over current through the components. Circuit design such as this must use a current sense circuit and higher rated current devices, or current sense circuits with several devices in parallel, which results in increased components costs to prevent component failures.

Figure 2:
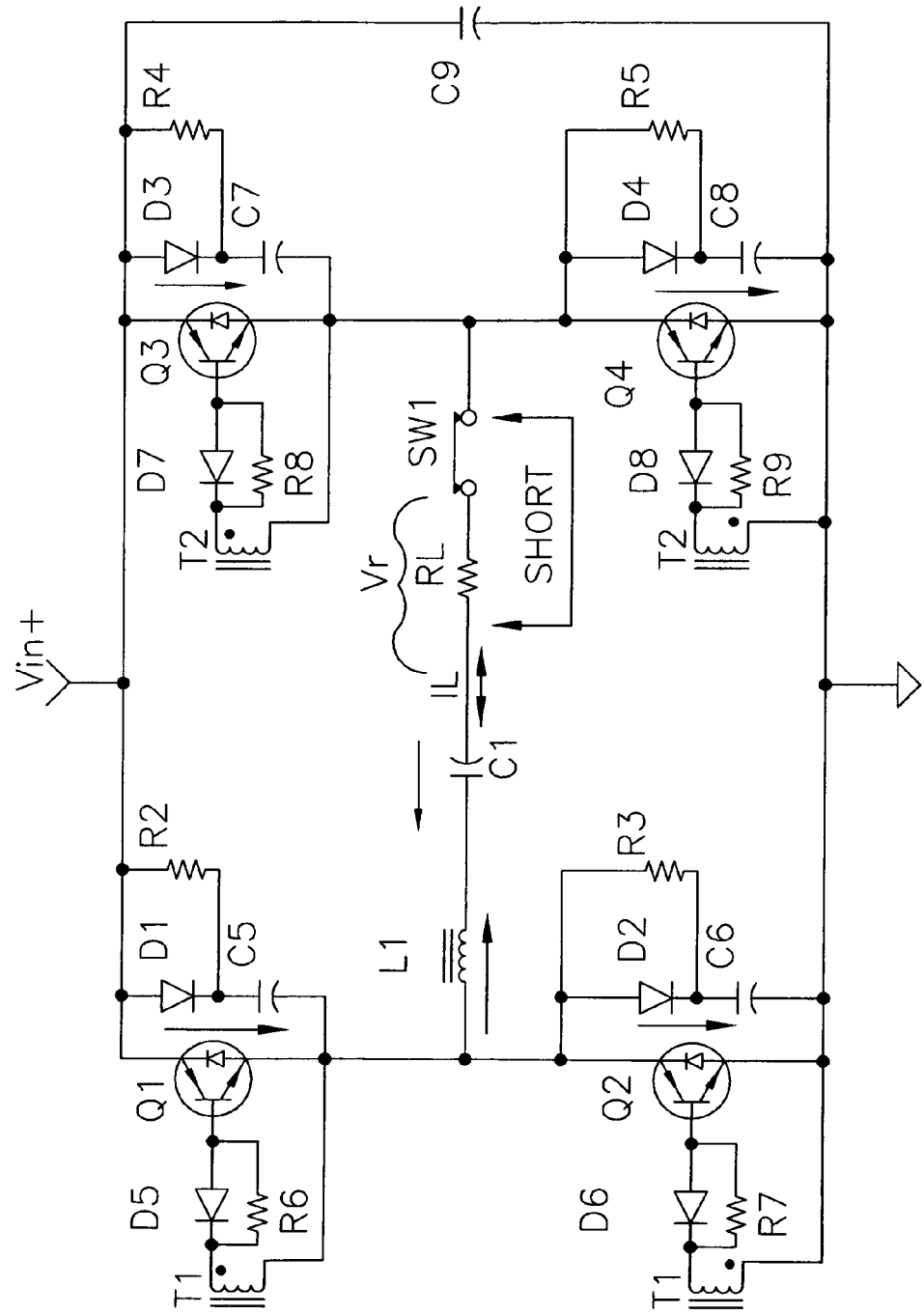
FIG. 2 according to prior art is a schematic representation of a series H-Bridge resonant converter.

FIG. 2 is a circuit diagram of an H-Bridge series resonant converter according to prior art. RL represents a load, which is equivalent to a transformer rectifier output. The converter operates at a constant switching frequency and is controlled by gate signals applied to Q1-Q4. As seen in the figure, the resonant tank circuit is comprised of L1, C1, and R1. SW1 represents a short or open in series with RL. When SW1 is closed, this represents a normal output condition. When SW1 is opened, this represents an opened output load condition. When SHORT is applied across SW1 and RL, this represents a shorted output condition. An input DC voltage, V+, is converted to an output voltage, Vr, and output current, Ir that in turn is applied to RL.

Figure 2A:
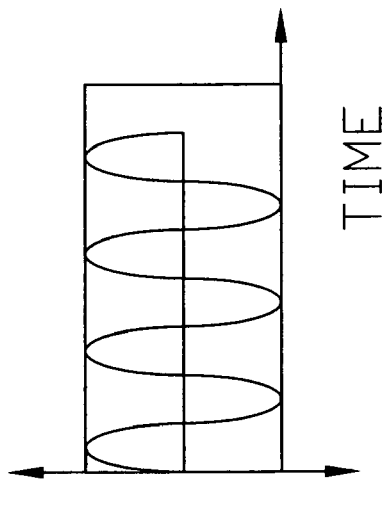
FIG. 2A- 2D according to prior art illustrates the current waveforms of the resonant tank circuit of a series resonant H-Bridge converter under load, short and open.

FIG. 2A illustrates the current IL through RL during normal output load conditions with SW1 closed. The current is at of normal amplitude and within the design limits.

Figure 2B:
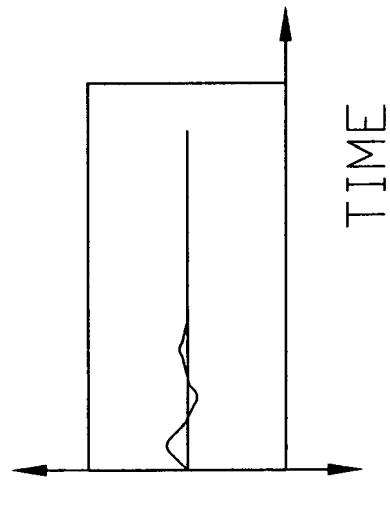

FIG. 2B is the current IL through L1, C1, and RL during an abnormal condition, with an open SW1. The current is at zero amplitude and within the design limits. This is the typical operation of a series resonance converter with an open output load RL. The converter will operate safely with the output open near resonance.

Figure 2C:
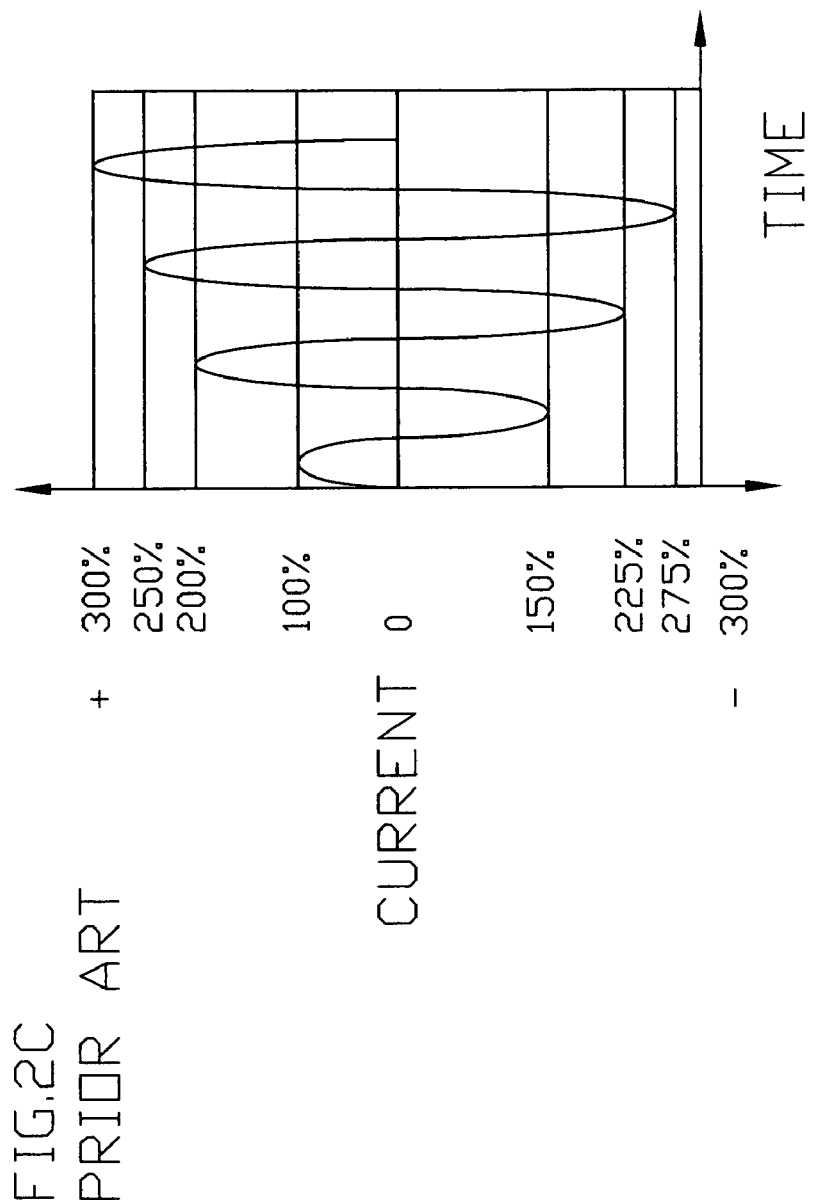
Figure 2D:
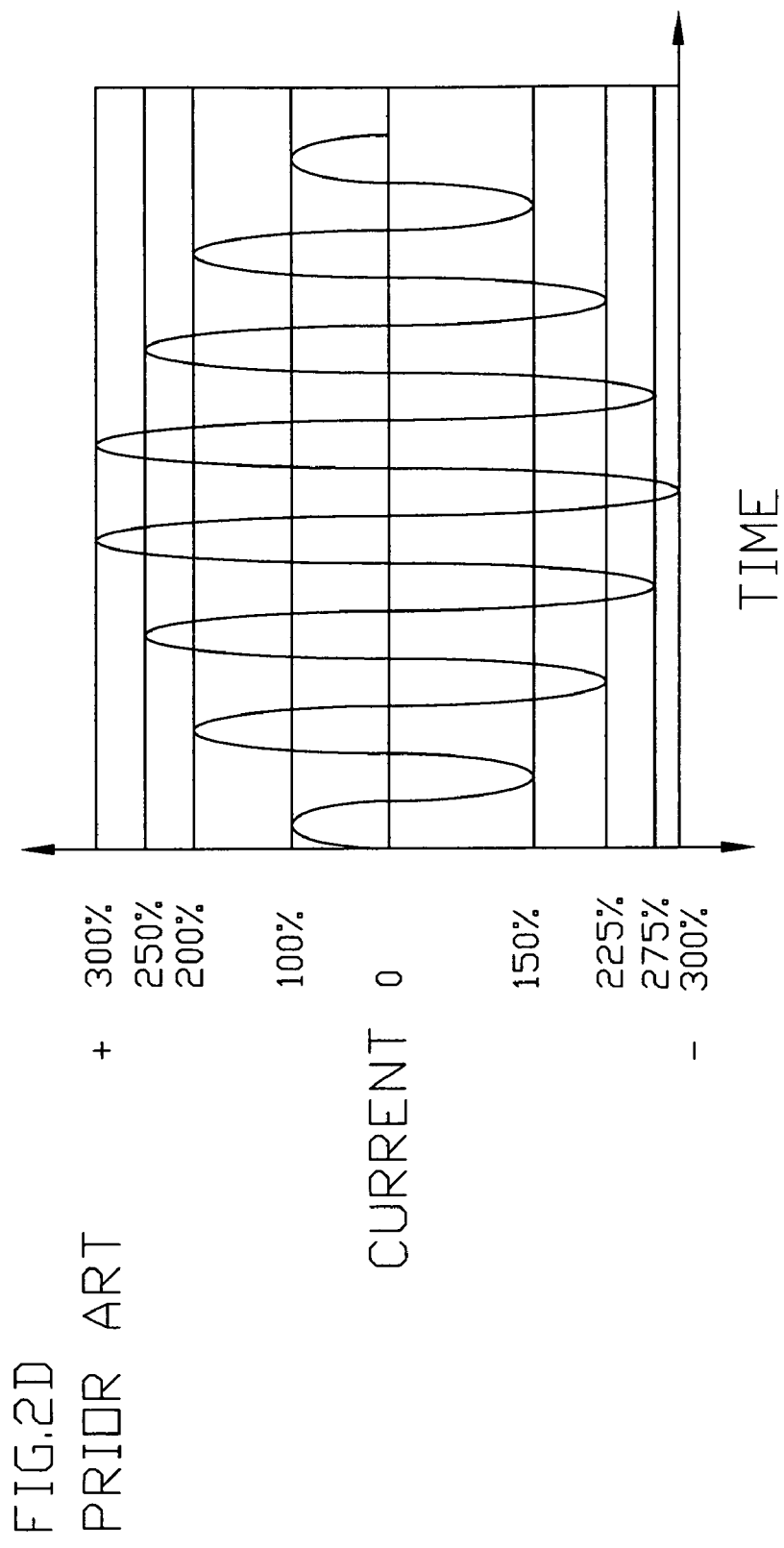

FIG. 2C and FIG. 2D illustrate the current IL through RL during abnormal conditions with SHORT across SW1 and RL. The current will keep climbing as shown in FIG. 2C if there is no external control to limit it.

FIG. 2D illustrates an over current control using external control circuits. The equation that explains the condition is IL=2Vin/πr. In a normal output load, the current IL=20 amp. The SHORT is applied across SW1 and RL to illustrate a shorted output load. For instance, if Vin=320V, and R=2 ohm the current IL=102 amp. This over current would destroy the resonant components L1, C1 and the switches Q1-Q4. Again, an over current control circuit cannot reduce this potential catastrophic over current through the components. Again this circuit design must use current sense circuits and higher rated current devices, or current sense circuits with several devices in parallel, which results in increased components costs to prevent component failures.

Figure 3:
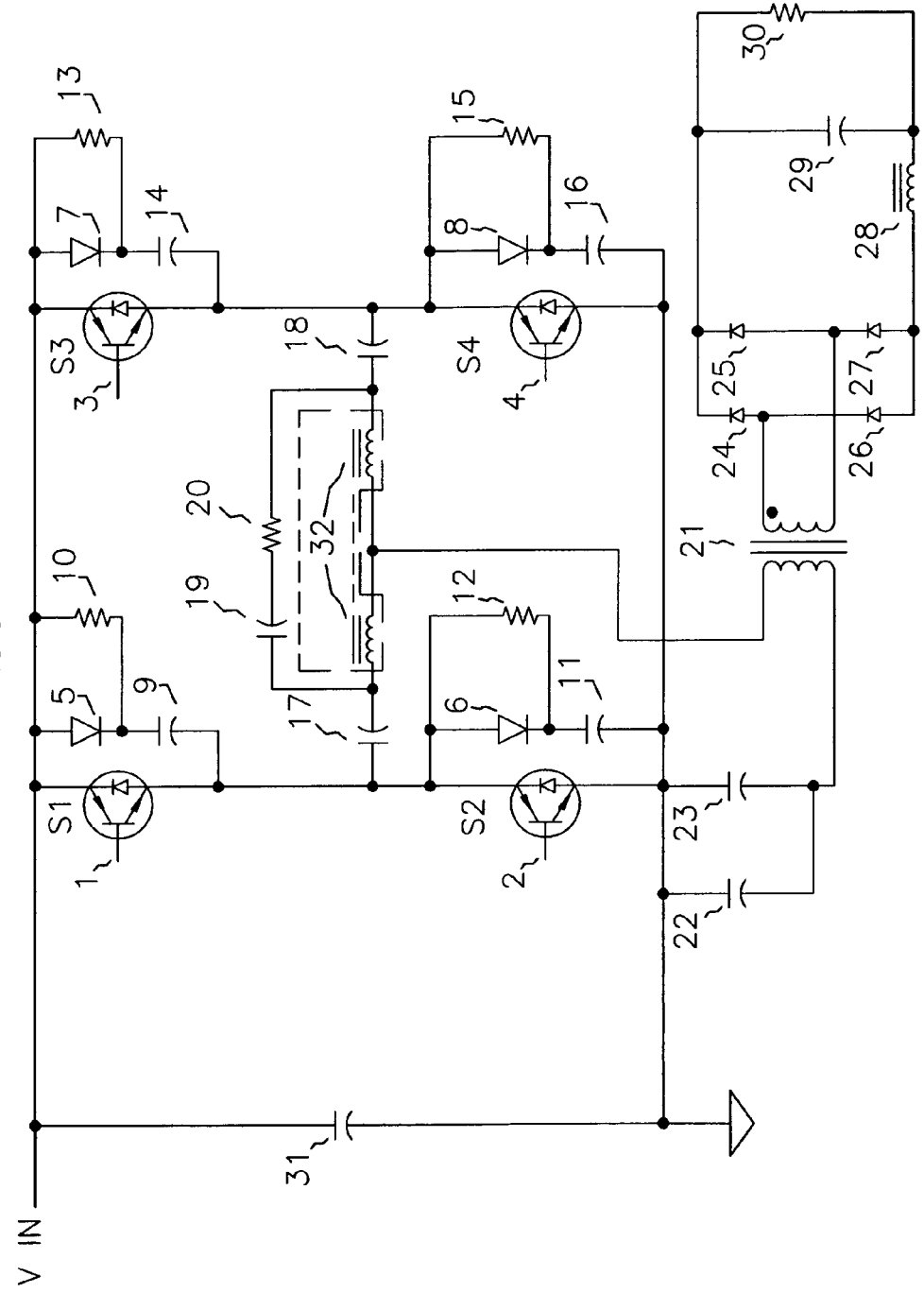
FIG. 3 is a schematic representation of the proposed invention.

FIG. 3 illustrates a phase shifted H bridge resonant converter with symmetrical currents in which the input is driven by a dc source voltage Vin. Input capacitor 31 reduces the ripple voltage of input voltage Vin. Input capacitor 31 supplies the energy to switching devices S1, S2, S3, and S4 (IGBT's shown with internal freewheeling diode). Energy returned from switching devices S1, S2, S3, S4 is stored in capacitor 31 during turn off intervals .S1, S2, S3, and S4 form a bridge converter input. The series combination of S1 and S2 is connected in parallel across capacitor 31 and the series combination of switching devices S3 and S4.

In FIG. 3 the snubber network across S1, is comprised of capacitor 9, diode 5, and resistor 10. The snubber network across S2 is comprised of capacitor 11, diode 6, and resistor 12. The snubber network across S3 is comprised of capacitor 14, diode 7, and resistor 13. The snubber network across S4 is comprised of capacitor 16, diode 8, and resistor 15. These components form the turn off loss circuit, and partial AC bleed for S1-S4 switches. Capacitors 17 and capacitor 18 are the high frequency AC coupling capacitors for the resonant tank circuit comprised of low mutually coupled inductor 32 in series with transformer 21, resonant capacitors 22 and 23. Capacitor 19 and resistor 20 across coupled inductor 16 form the main AC bleeder network. The output consists of Transformer 21, diodes 24, 25, 26, 27, inductor 28, capacitor 29, and load 30 (resistive load).

In FIG. 3, the DC output voltage is controlled by a fixed frequency by phase shifting of the two half bridge legs. The four switching devices S1-S4 have considerable lower current rating than employed in other switching converters. The switches depicted in FIG. 3 are IGBT's (insulated bipolar transistors) with a freewheeling diode or they could be replaced with FET (field effect transistor) with an accompanying freewheeling diode. Therefore, the circuit in FIG. 3 is more amendable to integration, which is desirable for higher power density.

FIG. 3A illustrates the current waveform during a full load, normal operation. This is the combined current from the junction of the low mutually coupled inductor 32, in series with transformer 21 and the capacitors 22 and 23. The current in is sinusoidal and at full output power.

FIG. 3B and FIG. 3C illustrate the full output current waveforms in the low mutually coupled inductor 32 branches. The currents are equal and symmetrical. The two half bridges (S1, S2 legs and S3, S4 legs) are in phase during full output power.

Referring to FIG. 3, the operational interval sequence is as follows. The operation begins when switches S1 and S3 are gated on and are conducting, thus supplying the full dc input voltage through capacitors 17 and 18, inductor 32 to transformer 21 and charges capacitors 22 and 23. The current through the transformer 21 is driven positive. The snubber caps 11 and 16 are charged to the dc input voltage during this first interval. At the end of this interval, switch S1 is turned off and switch S3 is still on. When S1 opens, capacitor 9 is charged to the voltage Vin through diode 5. S3 continues driving current through the loosely coupled inductor 32, capacitor 17, towards ground through the anti-parallel diode of switch S2, which in turn, discharges capacitor 11 through resistor 12. The voltage across switch S2 is now zero.

The second interval proceeds when switch S2 turns on. S3 turns off, and capacitor 14 is charged to the voltage Vin through diode 7. S2 continues driving current through the low mutually coupled inductor 32, capacitor 18, towards ground through the anti-parallel diode of switch S4, which in turn, discharges capacitor 16 through resistor 15. The voltage across switch S4 is now zero.

The third interval proceeds when switch S4 is turned on, with switch S2 still on, which discharges capacitors 22, 23 through transformer 21, inductor 32, and capacitors 17, 18. The current through transformer 21 is driven negative from the stored charge of capacitors 22, 23, through loosely coupled inductor 32, capacitors 17, 18. At the end of this interval, switch S2 is turned off and switch S4 is still on. The loosely coupled inductor 32 starts to drive current towards the DC buss Vin, through capacitor 17, the anti-parallel diode of switch S1, and discharges capacitor 9 through resistor 10. The voltage across switch S1 is now zero.

In the fourth interval, S1 turns on. The low mutually inductor 32 starts to drive current towards the DC buss Vin, through capacitor 18, the anti-parallel diode of switch S3, and discharges capacitor 14 through resistor 13. Interval 1 now repeats. This completes the sequence. The resulting current waveform through transformer 21 is shown in FIG. 3A. Branch currents through inductor 32 are shown in FIG. 3B. The above intervals describe the proposed phase shifted H bridge resonant converter with the low mutually coupled inductor 32.

The low mutually coupled inductor 32 balances the current through the two branches S1, S2 and S3, S4 during full output conditions. The resulting current through the two branches is shown in FIG. 3B, FIG. 3C and is equal to one half of the total current through transformer 21. The total current is shown in FIG. 3A.

FIG. 3D illustrates the converter current through transformer 21, when driven into over load, as in a near short condition of resistor 30. The current waveform illustrates that the overload does not exceed 125% of the normal load current. The operating frequency and chosen impedances of the low mutually coupled inductor 32 and capacitors 22, and 23, are designed to prevent current overload from exceeding this value.

FIG. 3E illustrates the converter current waveform through the low mutually coupled inductor 32 in branch S1, S2 or S3, S4 and transformer 21. The current can never exceed the value of Vlm=2πFLIm. This states that the voltage across the low mutually coupled inductor 32 in branch S1, S2, or S3, S4, is equal to the frequency times the current applied to the inductor.

Furthermore, the Q of the circuit is relatively flat, which results in lack of harmonics near resonance that cause the current to rise at an uncontrollable rate. The impedance of the circuit is based on Q=2πL/2Ri and Zo=√2L/C. Ri represents the impedance of transformer 21, and all the output components on the secondary side. When shorted to zero, there would be no Q and only the inductor current through the loosely coupled inductor 32. The current waveform would be triangular and conform to equation E=Ldi/dt. Hence, this demonstrates the converter currents through branches S1, S2, or S3, S4 would not exceed the desired maximum current.

In an open output load, impedance of transformer 21 becomes a high resistance (Ri). There is only a small current through the loosely coupled inductor 32. The current through low mutually coupled inductor 32 would be triangular and Ri becomes a large resistance (Q=2πL/2Ri). The resulting Q of the circuit approaches zero. The resulting currents through branches S1, S2, or S3, S4, and capacitors 21, 23 would be reduced below the desired maximum current of the design.

Thus, this converter is inherently short and open circuit protected by the impedances of the resonant circuits.

FIG. 3F, FIG. 3G, FIG. 3H illustrates the currents through the low mutually coupled inductor 32 in branch S1, S2, and branch S3, S4 with output control at 50% load. The currents are symmetrical to each other. This condition occurs because of the low mutual coupling of the inductor, which helps balance these branch currents.

Figure 3I:
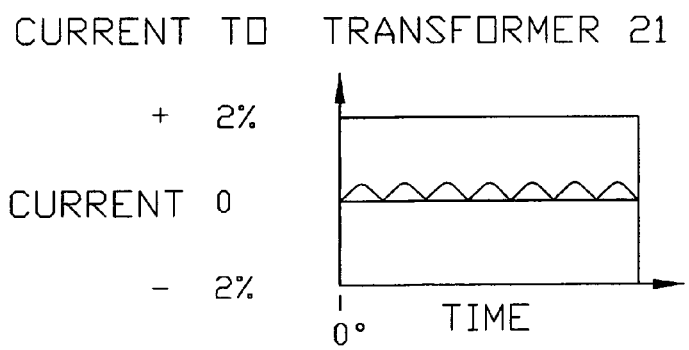
Figure 3J:
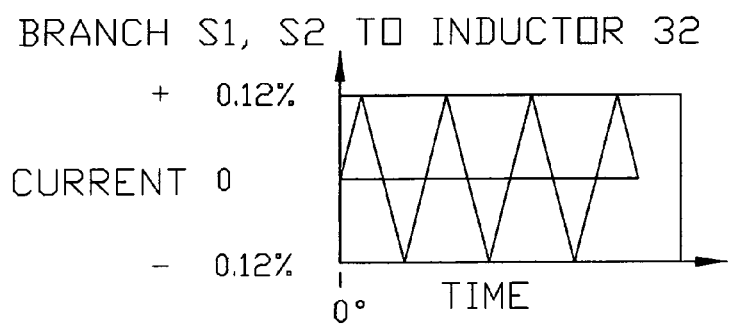
Figure 3K:
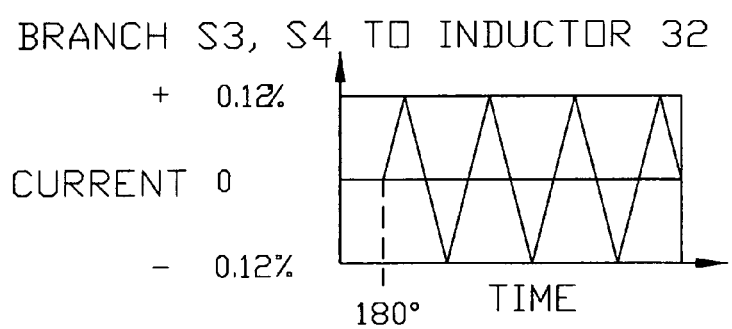

FIG. 3I, FIG. 3J, FIG. 3K illustrates the currents through the loosely coupled inductor 32 in branch S1, S2, and branch S3, S4 with output control to zero, under no load. The low mutually coupled inductor 32, and AC bleeder components (capacitor 19 and resistor 20) balance the no load current equally in both branches. This nulls the branch current to a small value.

FIG. 4 illustrates a partial control scheme typically used in phase-shifted converters. The control circuit can turn the remainder of the current to the transformer completely off, if desired. The addition of Comparator U9 will turn off Q5, which in turn, terminates the pulses to the output. The comparator level is adjusted at a voltage less than the slope of the ramp of the error amplifier. This method assures that the phase-shift to minimum output will occur before the output pulses are terminated. An error amplifier section is typically connected to the PWM (pulse width modulator). This control scheme is designed to work from a Dc range of −0.3 Vdc to +5Vdc.

The low mutually coupled inductor 32 in FIG. 3 is of unique construction. The design is crucial for the performance of this converter. The core is of Nickel-Zinc Ferrite material and has a C Core shape. There are two coils with one coil on each leg of the C Core. The turns on each leg of the coils must be equal. The coils are attached in series, the center point of which becomes the point of attachment to the transformer. The end attachment points are connected to capacitors 17 and 18. The open ends of the C Core must be closed with Nickel-Zinc Ferrite material with a gap. The inductance, core gap, and current requirements are established for the design. The low mutually coupled inductor 32 is connected as described above with the output conditions set at no load and zero output(phase-shifted to zero without the comparator circuit mentioned above). Measurements are taken of the branch currents in the proposed circuit. The placement of the coils on the C core is adjusted manually, up or down, to establish the minimum output current and balanced branch currents. The coil placement on the core is thus established.

Therefore, when the low mutually coupled inductor, with the interaction between the two coils that provides symmetrical currents within the switches and resonant tank circuit is designed correctly, under a no load and zero output condition, wherein the resulting output voltage and current will approach zero. The currents through the branches S1, S2, and S3, S4 will be equal and balanced. A secondary function of capacitors 17 and 18 is to isolate the DC from the output of the two half bridges mentioned above, allowing the transformer to be replaced with a resistive load. This allows the proposed circuit to be used for other applications other than power supplies such as induction heating.

I claim:

1. A phase shifted H-bridge resonant converter with symmetrical currents comprising:

first and second pairs of series connected controllable switching devices, the first and second pairs of said switching devices parallel connected across a first capacitor and coupled to a DC power source, each of said switching devices comprising; an IGBT with internal anti-parallel diode, turn off network with turn off diode in parallel with a turn off resistor, in series with a turn off capacitor connected across each of said switching devices;

a low mutually coupled inductor with first and second windings, each winding with a first terminal and a second terminal, wherein said second terminal of said first winding is connected to said first terminal of said second winding to form a center tap terminal;

an AC load comprising a second capacitor in series with a resistor, wherein said second capacitor is connected to said first terminal of said first winding of said low mutually coupled inductor, and said resistor is connected to said second terminal of said second winding of said low mutually coupled inductor;

first and second DC blocking capacitors, said first DC blocking capacitor connected between said first terminal of said first winding of said low mutually coupled inductor and a common terminal of said first pair of switching devices; and said second DC blocking capacitor connected between said second terminal of said second winding of said low mutually coupled inductor and a common terminal of said second pair switching devices;

a transformer with first and second windings, each winding with a first terminal and a second terminal, said first terminal of said first winding connected to said center tap terminal of said low mutually coupled inductor, said second terminal of said first winding connected to first and second resonant capacitors connected in parallel, and coupled to the DC power source ground; and an output circuit comprising said second winding of said transformer connected to a full wave bridge rectifier, filter inductor, filter capacitor and a load resistor, wherein said low mutually coupled inductor, said AC load, and said first and second resonant capacitors form a resonant tank circuit for producing said symmetrical currents within said first and second pairs of switching devices and said transformer.

2. The phase shifted H-bridge resonant converter with symmetrical currents of claim 1, wherein the currents through said first and second pairs of switching devices and said transformer will operate at a predetermined current rating during a continuous overload condition of said transformer and said output circuit in phase shift, wherein additional components and circuits to correct overload conditions are not required.

3. The phase shifted H-bridge resonant converter with symmetrical currents of claim 2, will operate at said predetermined current rating during a continuous short circuit condition of said transformer and said output circuit.

4. The phase shifted H-bridge resonant converter with symmetrical currents of claim 2, will operate at said predetermined current rating during a continuous open circuit condition.

5. The phase shifted H-bridge resonant converter with symmetrical currents of claim 1, said switching devices may be substituted with MOSFET's with supplemental external anti-parallel diode.

6. The phase shifted H-bridge resonant converter with symmetrical currents of claims 1, wherein the converter's said transformer and said output circuit has the flexibility of being substituted with a resistive load, capacitive load or inductive load.

* * * * *